United States Patent [19]

Mitchell et al.

[11] 4,358,126
[45] Nov. 9, 1982

[54] INVALID VEHICLES

[76] Inventors: Arthur W. Mitchell, "Sandyacre" 18, Ballyardle Rd., Kilkeel, County Down; Elbert J. Cornish, 12, Melrose Park, Kilkeel, County Down, both of Ireland

[21] Appl. No.: 187,177

[22] Filed: Sep. 15, 1980

Related U.S. Application Data

[63] Continuation-in-part of Ser. No. 20,229, Mar. 12, 1979, abandoned.

[30] Foreign Application Priority Data

Mar. 14, 1978 [GB] United Kingdom ............... 10431/78

[51] Int. Cl.³ .............................................. B62M 1/14
[52] U.S. Cl. ............................ 280/242 WC; 280/237; 280/246; 297/DIG. 4
[58] Field of Search ........... 280/242 R, 242 WC, 244, 280/246, 237; 297/DIG. 4; 192/43.1, 43.2, 44

[56] References Cited

U.S. PATENT DOCUMENTS

| | | | |
|---|---|---|---|
| 838,228 | 12/1906 | Williams | 280/242 WC |
| 3,265,171 | 8/1966 | Kilness | 192/43.2 |
| 3,549,161 | 12/1970 | Pusztay | 280/3 |
| 3,666,292 | 5/1972 | Bartos | 280/242 WC |
| 3,994,509 | 11/1976 | Schaeffer | 280/242 WC |

FOREIGN PATENT DOCUMENTS 529233 5/1957 Belgium ..................... 280/242 WC Primary Examiner—Richard A. Bertsch
Assistant Examiner—Donn McGiehan
Attorney, Agent, or Firm—Nathaniel A. Humphries

[57] ABSTRACT

A 3-wheeled velociman having individual power transmission units 40 to each of the co-axial rear wheels 11, 12. Power to the units is supplied by a pair of hand activated levers 50, 51 each of which connects with an input shaft 41 to the respective unit via a ratchet mechanism 55 and transmits the power to the input shaft 41 in the desired forward or reverse rotational direction depending on the position of a pawl engagable with the ratchet.

A gear change switch 60 controls the forward, reverse or neutral position of the pawl and consequently the rotational direction of the input shaft. The switch 60 is adjacent the hand grip of each lever 50, 51, and so is easily operated by the user. The input shaft drives an output shaft 42 on which the corresponding rear wheel is mounted.

The hand levers are fulcrummed to the input shaft below and to the rear of the seat 18 and lie at an acute angle to the horizontal making operation of the levers by the user less tiring on the user's arms than on upright levers.

3 Claims, 7 Drawing Figures

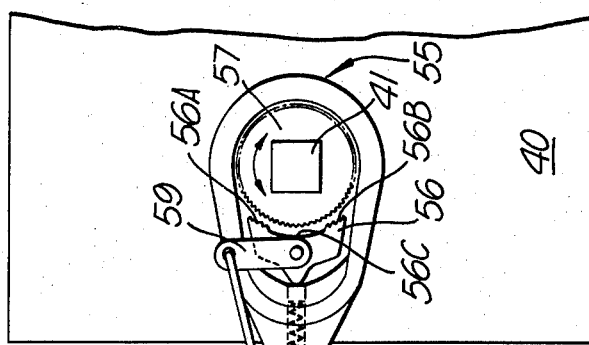
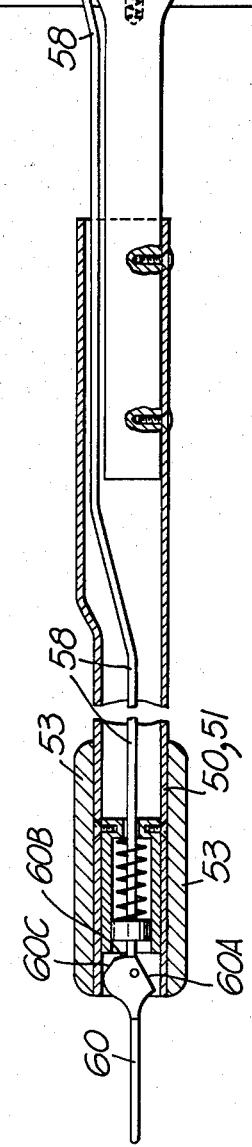
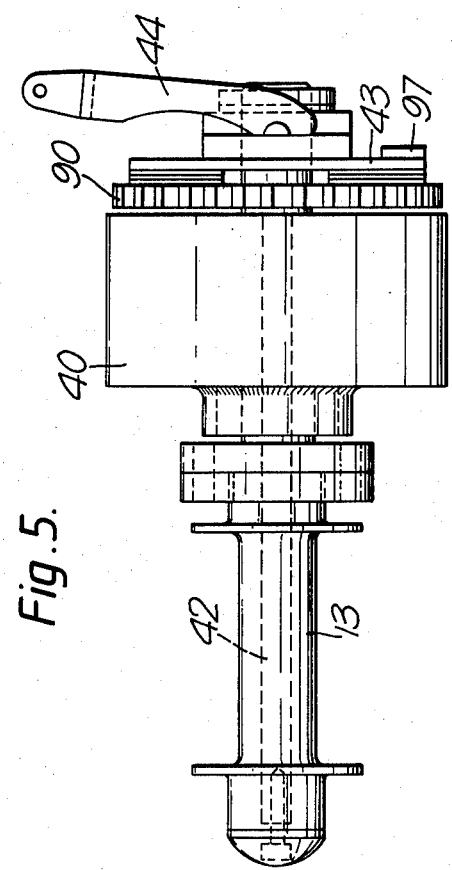
Fig. 3.
Fig. 5.

INVALID VEHICLES

This is a continuation-in-part of application Ser. No. 20,229, filed Mar. 12, 1979, now abandoned.

This invention relates to invalid vehicles for indoor and outdoor use, the vehicles being in the form of velocimans having a frame on which a driving seat and three wheels triangularly disposed are mounted and of the kind in which two of the three wheels are transversely spaced co-axially, the other single wheel is disposed longitudinally relatively thereto and the seat is disposed within said triangular disposition. Velocimans of the kind stated are intended primarily for use by individuals having physical lower limb diability.

Three-wheeled velocimans are known wherein the power to the wheels is provided by the user by means of rotary hand pedals which drive the front single wheel of by side levers which, by a back and forward pump action, transmit power to the rear wheels.

The rotary hand pedal arrangement is disadvantageous because of the lack of control for steering and a poor compromise in the availability of braking or reverse motion. The known pump action arrangement is disadvantageous because the levers are substantially upright and in use the user's hands are at or above shoulder level so that the pump action can become tiring on the arms. Most use the crank method of conversion of pump motion into rotary motion. This is inconsistant in action and give poor return for energy input. A further disadvantage of this method is that although forward and reverse drive is possible, simultaneous and rhythmic action of the levers is rarely possible and cannot remain in phase for many yards. Also, due to angles of rotation, lockout will occur and the velociman will require a push before operation can commence. In addition, the stroke is fixed and often not comfortable for the user or correct for the prevailing conditions or terrain.

An object of the present invention is to obviate or mitigate the aforementioned disadvantages.

According to the present invention, there is provided an invalid vehicle for indoor and outdoor use in the form of a velociman having a frame, three wheels mounted on said frame in triangular disposition, two of said wheels being co-axial and transversely spaced, the other single wheel being longitudinally spaced therefrom and having a low friction rotatable movement relative to the frame, a seat mounted on said frame within said triangular disposition, hand operated lever means located positioned adjacent each side of the seat, one end of each lever being fulcrummed at a location below the level of the seat by a hand grip on the other end of said lever for gripping by a person seated in the seat for pivoting the levers about their fulcrums in a fore and aft pump action, and a transmission means to drive each of said co-axial wheels independently of the other co-axial wheel, each transmission means having input and output drive means with the input drive means being connected to an associated one of said hand operated lever means and the output drive means being connected to the axle of one of the co-axial wheels whereby pump action of the associated lever means causes rotation of the input shaft, and ratchet means mounted on the input drive shaft for selectively providing either forward or reverse motion of the output drive shafts and further including a hand operated switch means mounted on each lever and linking means connecting said switch means with said ratchet means to provide selective positioning thereof. The transmission mechanism allows the levers to be slipped to a comfortable "phase" situation on each side to give a rhythmic motion at will and a length of power stroke to suit the individual's physique, mood or the terrain requirement. Power output remains almost constant throughout the stroke. It is also possible to use one lever in forward motion and one in reverse motion to give the minimum possible turning radius, by use of a control mechanism to select forward, neutral or reverse.

An embodiment of the present invention will now be described, by way of example, with reference to the accompanying drawings, in which:

FIG. 3 is a side view in part section of a hand lever to an enlarged scale;

Figure 6A:
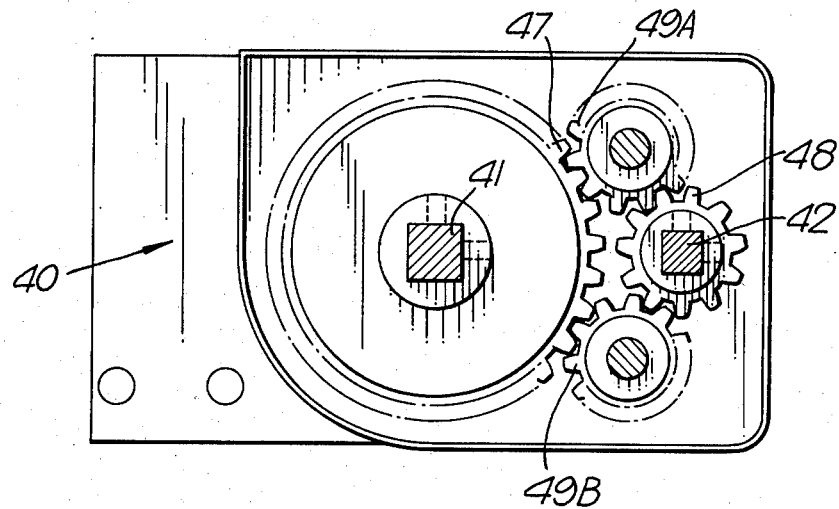
Figure 6B:
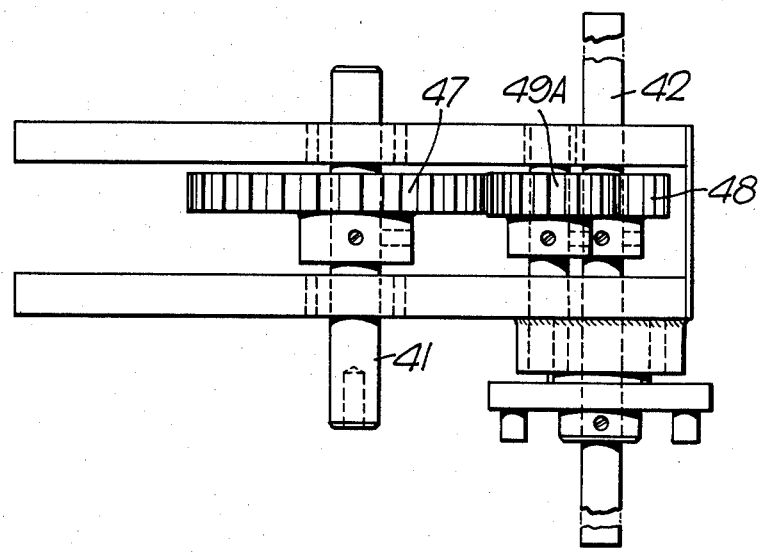

FIG. 5 is an aft end view of an output shaft showing the transmission box, the brake and a hub unit mounted thereon to the same scale as FIG. 3 the hand lever and brake lever being omitted; and FIGS. 6A and 6B are respectively a side view and a plan view of the transmission box, the outboard side of the box being omitted for clarity in the side view, and the top being omitted for clarity in the plan view.

An invalid vehicle, for use particularly by a physically handicapped individual who has a disability in one or both lower limbs, is in the form of a velociman of the kind stated in which the three wheels 10, 11, 12 are similar, each having a central hub unit 13 from around which spokes 14 extend to a rim mounting a pneumatic inflatable or solid tire 15. The wheels are triangularly disposed one single wheel 10 being, in this embodiment, forward to two co-axial transversely spaced wheels 11, 12. The frame 16 of the velociman is formed from an elongate tubular section longitudinal in the forward or reverse direction of travel. The frame has a profile in side elevation of an upright 17 at one end, namely, the rear end, on which the seat 18 is mounted, a horizontal central portion 19 and a forward extending swan neck portion 20 to the outer end of which an upright sleeve 21 is secured. A column is journalled in the sleeve 21 and made captive for low friction rotatable movement only. The column has a fork 22 below said sleeve 21, the two limbs of said fork 22 similarly curving rearwardly at their lower ends. The front wheel 10 is accommodated between said limbs and an axle of the hub unit 13 is secured at each end to one of the limbs. A foot platform 30 is located over the horizontal portion 19 and is supported by transverse member 31 extending out from or secured to said horizontal portion 19.

A sub-frame 32 of U-shape in plan is secured at its web 33 to the rear of the frame 16 at the bottom of the upright 17 thereof with the limbs 34 extending rearwardly in a horizontal direction as an extension of the horizontal portion 19 of the frame 16. The outer end of each limb of the sub-frame 32 carries a transmission unit 40.

Each transmission unit 40 is in the form of a single speed gearbox and has an input shaft 41 and an output shaft 42 disposed traversely with the input shaft 41 forward of the output shaft 42 and having rear wheels 47, 48 which mesh via idler rollers 49A, 49B. Idler rollers 49A and 49B may be omitted if found not to be required.

Figure 1:
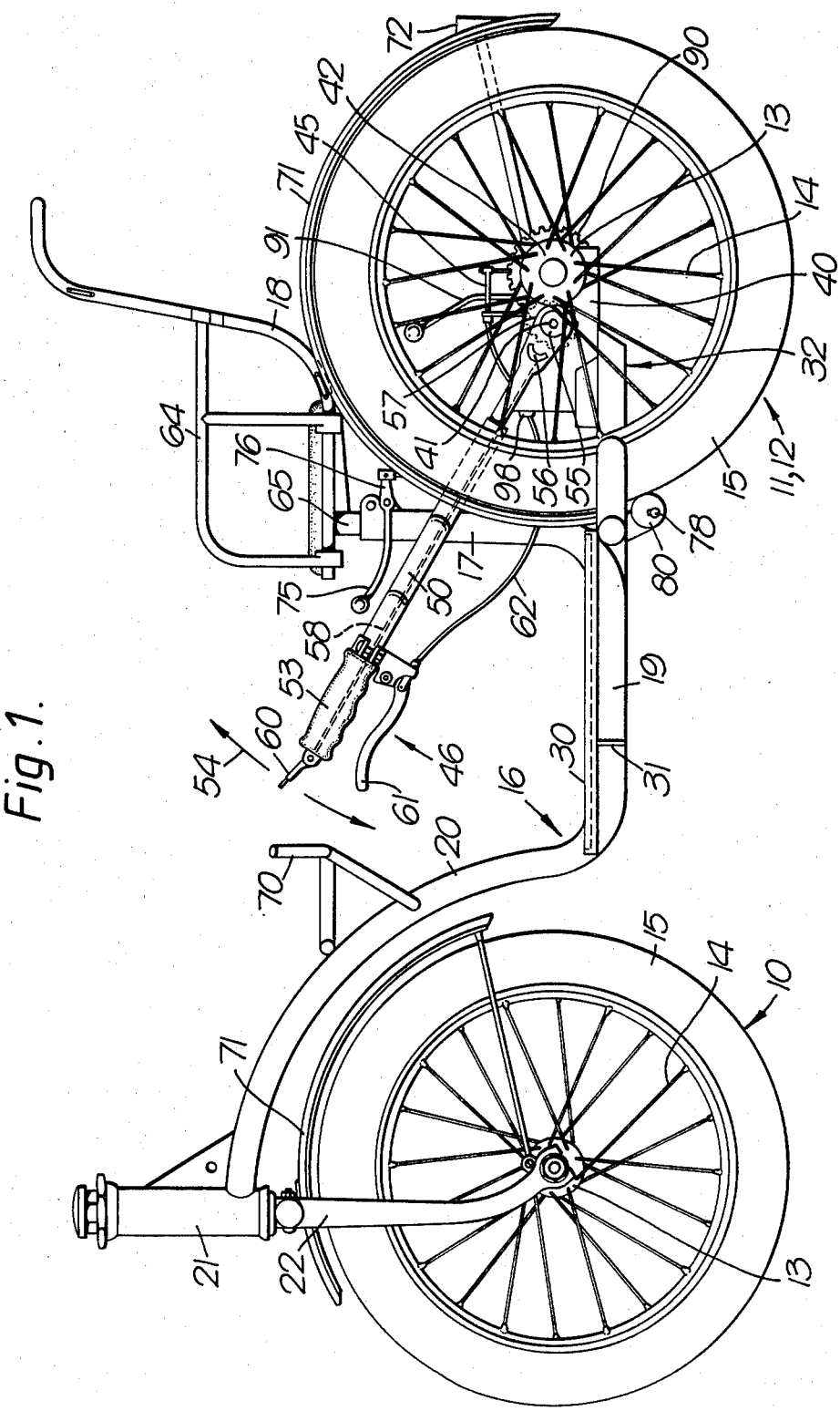
FIG. 1 is a side view of an invalid vehicle according to the invention.
Figure 2:
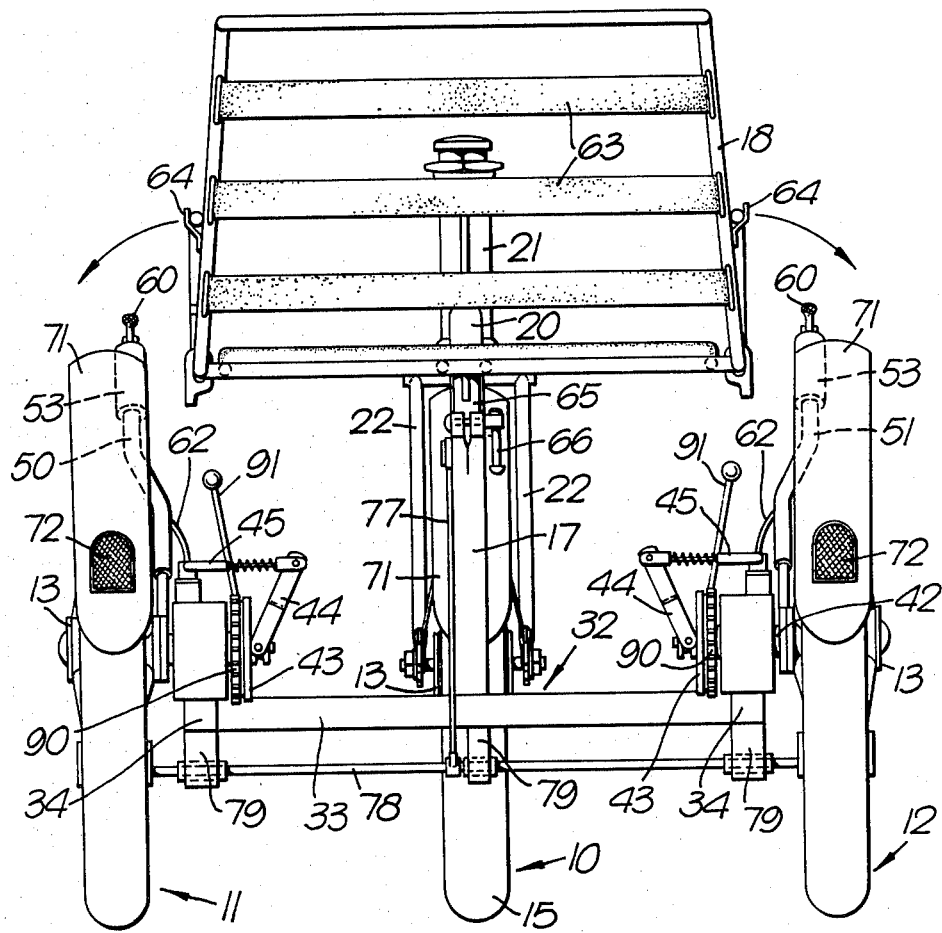
FIG. 2 is a rear view.
Figure 4:
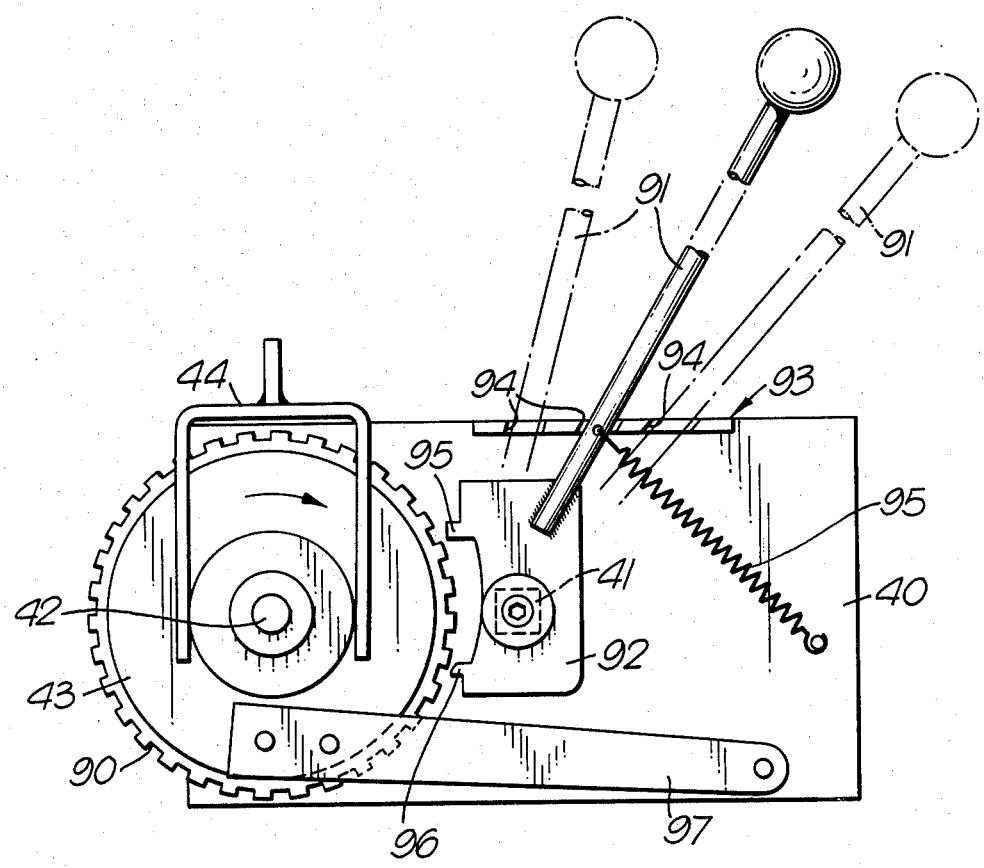
FIG. 4 is a side view of the inboard side of a transmission box showing a parking brake and to the same scale as FIG. 3 the lever of the brake being shown in full line in a neutral position and shown in broken line in two other positions.

Each output shaft 42 runs through a transmission unit 40 and has either a fixed or variable ratio. The outboard end of each shaft 42 carries a rear wheel 11 or 12 (FIG. 5) and on the inboard end a brake 43 of disc or drum design. The brake 43 is connected to a lever 44 (FIG. 4) which is activated through cable connectors 45 (FIGS. 1 and 2).

Two hand activated levers 50, 51 are provided, one at each side of the seat 18. Each hand lever 50, 51 fulcrummed at its lower end to an outboard end of the input shaft 41, in this case, rearwardly of the seat and extends forwardly to terminate in a hand grip 53. These hand levers 50, 51 can be pivoted about their fulcrums in an up-and-down fore-and-aft pumping action in an arcuate path indicated by arrows 54. This is done by a person seated in the seat 18 and transmits drive to the transmission unit 40 as thereinafter described.

Each hand lever 50, 51 has at its lower end a pawl and ratchet mechanism 55 (FIGS. 1 and 3), the pawl 56 of which is mounted on the lever 50, 51 and the ratchet 57 of which is fixedly mounted on the input shaft 41. The pawl 56 is pivotal on the hand lever and has a flat central portion 56C positioned between two ends 56A and 56B either of which ends. One or other of the ends 56B or 56C can engage teeth of the ratchet 57 to determine forward or reverse movement thereof on movement of the hand level 50, 51 the pawl 56 forcing the ratchet 57 to rotate on one stroke of the hand lever 50, 51, but running freely over the pawl 56 of the pawl and ratchet on the return stroke. When neither pawl end engages the ratchet the ratchet will not rotate on movement of the hand lever 50, 51. These positions of the pawl are controlled by a change control mechanism comprising a three-positioned switch 60 mounted axially on the hand grip end of the hand lever 50, 51 and connected to the pawl 56 of the mechanism 55 by a cable or rod 58 or other linkage passing down the inside of the respective levers 50, 51 and connected to the pawl 56 by lever 59. The three positions of the switch 60 dictated by flat surfaces 60A, 60B and 60C in contact with the top of the rod 58 are respectively for 'forward' for forward motion, 'central' for neutral, i.e. no motion, and 'back' for reverse. The switch 60 can be biassed to the forward position.

A cable-operated handbrake 46 provided for each rear wheel 11, 12 has a hand grip 61 mounted below the hand grip 53 of the lever 50, 51 and a cable 62 leading therefrom via the cable connector 45 to the brake lever 44 controlled by hand therefrom.

The driving seat 18 is of tubular frame design upholstered in a sling back fashion to provide a back support portion 63. There is a supporting arm 64 on each side, one of which may fold down and provide a lateral extension of the seat. A person mounting or leaving the seat can use this extension to move himself sideways on to or off the seat.

The seat 18 has a depending shaft 65 which is located within the upstanding frame portion 17 and a clamp 66 (FIG. 2) is provided to lock the seat in its desired position. The shaft 65 is located centrally at the front of the seat. Where it is inconvenient to use the extension flap to assist the user mounting or leaving the seat, the seat can be unlocked for rotation through 90° or 180° to permit the user to occupy or leave the seat either from the side of the vehicle or from the rear. Also, when the seat is rotated through 180° the user can still operate the hand levers 50, 51 to drive the vehicle in reverse so that the single wheel becomes a trailing wheel.

Side projections 70 from the swan neck 20 are supports for the heels of individuals who need to wear straight leg calipers. Clips are provided on the platform 30 for carrying walking aids, such as sticks or crutches, of a user. Mudguards 71 are provided for each wheel and a red reflector 72 is mounted on the mudguard for each rear wheel 11, 12.

An emergency brake is provided to act on both co-axial wheels 11, 12 simultaneously. This brake comprises a hand lever 75 located on the upstanding frame portion 17 below the seat 18, a pivotal arm 76 which is pivotally connected to the lever 75 and and pivots on movement of said lever 75, a link 77 extending down the upstand 17 to a transverse rod 78 carried on pivotal flanges 79 depending from the back portion 33. The rod 78 carries eccentric cam brakes 80 which, on upward pivotal movement of the hand lever 75, engage the tires of wheels 11, 12.

A parking brake is provided for each rear wheel 11, 12 and comprises a ratchet 90 mounted on the inner extremity of the output shaft 42 and a pawl 92 which can be manually engaged with the ratchet 90 to prevent rotation of the ratchet 90. This pawl and ratchet mechanism may also be used to advantage when the vehicle is travelling up an incline. A pawl lever 91 of each mechanism is square to the upper end of the pawl 92 having two alternate working positions. The pawl 92 is centrally pivoted on an extension of the input shaft 41 with the square toothed ratchet 90 on an extension of the drive shaft 42. The lever 91 is selectively movable into any one of three positions provided on a plate 93 extending inboard from the top of the transmission box 40, the plate 93 having three open ended slots 94, one for each position and into which the shank of the lever 91 can be accomodated. The lever 91 is held in any one of said slota 94 by spring biassing 95 anchored between the shank of the lever 91 and the inboard side of the transmission box 40. Normally, the lever 91 is located in the middle slot which corresponds to a non-operative neutral position of the pawl 92. The slots 94 on each side of the middle slot 94 are for alternative pawl operating positions; one to the left of the neutral position in FIG. 4, for use in parking where a square tooth 95 of the pawl 92 meshes with a square tooth of the ratchet 90 to prevent movement of the ratchet 90 or shaft 42, and one to the right of the neutral position in FIG. 4, for use in hill-climbing where a tooth 96 of the pawl 92 having an inclined face meshes with the teeth of the ratchet 90 to allow movement in one direction only, i.e. the forward direction. When the lever 91 is in this latter position, the velociman cannot be reversed. A brake tongue arm 97 is provided to prevent the brake 43 from rotating with the shaft 42.

Two similar supports (not shown) may be provided on each pertaining side of the seat, one support for each hand lever and on which said lever can rest in a horizontal position when not in use, the supports being to conveniently position the hand grip of the hand levers at or about the lower extent of a user's arms such that he/she need not bend down to grip the hand grips.

In use, a user mounts the vehicle either by sitting on the lowered support arm 64 and moving inboard on to the seat 18 or by loosening and rotating the seat through 90° or 180° sitting on it and rotating it to the forward facing direction and locking it via the clamp 66. As the switch 60 is biassed to give forward drive the user need only change to neutral or reverse if necessary. Sticks or crutches are secured in the brackets or clips provided. Propulsion of the velociman by means of arcuate pumping oscillation of the two hand levers 50, 51 will give forward drive and by applying different efforts to each lever, the velociman can be propelled in any forward direction since the front wheel follows the direction determined by the use of the hand lever means acting on the rear wheel. The ratchet mechanism 55 at the lower end of the hand lever gives reverse motion and forward motion controlled by the terminal switch 60, forward position for forward, central for neutral and back position for reverse. When free wheeling down a gradient steering is maintained by using individual brakes 46. Applying left brake steers to left and vice versa. The seat is fitted with anchor points for a safety harness. Transmissions other than as described may be used without departing from the scope of the invention.

The velociman as hereinbefore described is advantageous over known velocimans in that the transmission can be set to forward, reverse or neutral thus increasing its manoeuvreability. Further, the position of the fulcrum of each hand lever 50, 51 and the acute angle at which the levers are located means that the hands of the user move in a more up-and-down arcuate path than is the case with known velocimans in which the path is more fore-and-aft. Further, the arcuate path of the hand levers hereinbefore described is lower than that of a known velociman and is less tiring on the user's arm.

In addition, using the ratchet mechanism at the lower end of hand levers, the arc of movement self-adjusts automatically to the physical limitations of the user. It is superior to crank-operated systems as there is no area of lever movement where the transmission of power to wheel is lost.

In a modification the switch 60 is biased to a forward position and is simply a button which can be depressed fully for reverse position and neutral position corresponds with a mid-way depression of the button. In this modification, arc limiter means are provided on the top face of the transmission box 40 near to the near face thereof to knock the switch into neutral as the vehicle is reversed unmanned i.e. without a person sitting in the seat.

We claim:

1. An invalid vehicle for indoor and outdoor use in the form of a velociman having a frame, three wheels mounted on said frame in triangular disposition, two of said wheels being co-axial and transversely spaced, the other single wheel being longitudinally spaced therefrom and having a low friction rotatable movement relative to the frame, a seat mounted on said frame within said triangular disposition, first and second hand operated lever means each respectively located positioned adjacent different sides of the seat, one end of each lever being fulcrummed at a location below the level of the seat by a hand grip on the other end of said lever for gripping by a person seated in the seat for pivoting the levers about their fulcrums in a fore and aft pump action, and first and second transmission means respectively associated with said first and second hand operated lever means to drive each of said co-axial wheels independently of the other co-axial wheel, each transmission means having input and output drive means with the input drive means being connected to the associated one of said hand operated lever means and the output drive means being connected to the axle of one of the co-axial wheels whereby pump action of the associated lever means causes rotation of the input drive means and pawl and ratchet means including a pawl mounted for pivotal movement on its associated lever and having first and second ends and a ratchet mounted on the input drive means and having teeth about its outer periphery and control means for selectively providing either forward or reverse motion of the output drive means including a hand operated switch means mounted on each lever and linking means connecting said switch means with said pawl to provide selective positioning thereof by pivoting said pawl so that a selected one of the outer ends of the pawl engages the teeth of the ratchet to provide driving force in the desired direction.

2. A vehicle as claimed in claim 1, wherein said first and second hand operated levers are fulcrummed at a location to the rear of the seat and extend forwardly at an acute angle to the horizontal.

3. A vehicle as claimed in either of claims 1 or 2, wherein said first and second hand operated levers, during the pump action move through an arc the upper limit of which is less than 90° to the horizontal.

* * * * *